United States Patent [19]

Puls

[11] 4,262,315
[45] Apr. 14, 1981

[54] TAPE CASSETTE TURN-OVER MECHANISM

[75] Inventor: Werner H. Puls, Northbrook, Ill.

[73] Assignee: Zenith Radio Corporation, Glenview, Ill.

[21] Appl. No.: 66,736

[22] Filed: Aug. 15, 1979

[51] Int. Cl.$^3$ ............................................. G11B 15/68
[52] U.S. Cl. ................................................... 360/96.5
[58] Field of Search ................................. 360/92, 96.5

[56] References Cited

U.S. PATENT DOCUMENTS

| | | | |
|---|---|---|---|
| 3,800,319 | 3/1974 | Fujimoto et al. | 360/92 |
| 3,833,224 | 9/1974 | Haake | 360/92 |
| 3,836,154 | 9/1974 | Ishikawa | 360/92 |
| 4,114,182 | 9/1978 | Zeh et al. | 360/92 |

Primary Examiner—Robert S. Tupper
Attorney, Agent, or Firm—Ralph E. Clarke, Jr.

[57] ABSTRACT

A turn-over mechanism for rectangular cassettes used in video and audio tape recording/reproducing in the first and a second direction is disclosed. The mechanism provides for turning over the cassette as it is raised and lowered from the operating deck of the recorder/reproducer. The mechanism comprises cassette holding means for detachably retaining the cassette. The cassette holding means is enclosed in main frame means; pivot means are included for rotation in the minor axis of the cassette within the main frame means. Paired arm means provide for rising and lowering the main frame means from and to the operating station. Each arm means is hingedly attached to the operating deck, and slidably engaged at the opposite end with the main frame means. The arm means hold the main frame means and the cassette substantially parallel with the deck during the raising and lowering. During the raising and lowering of the cassette, means provide for rotating the cassette holding means and the cassette 180°. The cassette is then lowered to the operating deck for playing the tape in a reverse direction.

2 Claims, 12 Drawing Figures

TAPE CASSETTE TURN-OVER MECHANISM

BACKGROUND OF THE INVENTION AND DISCLOSURE STATEMENT

The present invention is generally related to video and audio tape recorders/reproducers and the like, and is more particularly concerned with the provision for the recording and playback of plural-track tapes contained in rectangular type cassettes. The tape drive means for conventional cassette-type recorder/reproducers normally provides for tape movement in either of two directions. Tape movement in one direction, a constant-speed mode, is carefully regulated and controlled to provide a constant tape speed when passing the transducer, providing for maximum fidelity without wow and flutter. Tape movement in the opposite direction is commonly the "rewind" mode, wherein the speed is much greater and relatively inconstant. In consequence, in recording or reproducing plural track tapes, it is necessary to turn the cassette over to utilize the constant-speed mode for tracks recorded in the opposite direction. While it is possible to provide constant tape speed and rewind speed in either direction, this additional capability adds considerbly to the complexity and cost of the mechanism and as a result is found only in tape recorder/reproducers of greater cost and less portability. Hence the need for means for turning over cassettes that provide effective, reliable operation coupled with manufacturing simplicity. The requirement to turn over magnetic tape cassettes for recording or reproducing in either of two directions has been addressed in disclosures by Haake, U.S. Pat. Nos. 3,833,224; Ishikawa, 3,836,154; Zeh et al, 4,114,182; and Fujimoto et al, 3,800,319, among others.

Ishikawa '154 discloses an apparatus for handling and automatically playing a plurality of conventional tape cassettes in a preselected sequential order. The cassettes are sequentially removed from a storage magazine by a loading means. The loading means places the cassette into a carrier means which is operable to place the cassette into a play position to reproduce the first track and then rotate the cassette 180° to reproduce the second track. After both tracks have been reproduced, the cassette is automatically replaced into the storage magazine. The storage magazine is then indexed and the procedure repeats itself. A preselected cassette may be continuously replayed without being returned to the storage magazine, a provision which is alleged to be unique.

Fujimoto '319 discloses a magazine-type system in which a plurality of tape cassettes are automatically turned over one after another and discharged in the same order.

Zeh et al '182 discloses a cassette turning mechanism in which a receptacle for the cassette is mounted for symmetrical rotation for turning on a shaft about the axis of the shaft. The shaft is turnably supported on a frame-mounted swing-axis and extends perpendicular to the axis of the swing-axis for rotation about the axis.

Haake '224 discloses a mechanism for lifting a tape cassette away from a play station where one of the record tracks was in position for reproduction to a position substantially perpendicular to the play station. The tape cassette is rotated approximately 180° to invert its orientation after which it is returned to the play station, positioning the second record track for reproduction.

Nozawa et al—U.S. Pat. No. 3,669,457 discloses a tape cassette-loading means including a tape cassette receiving means which is mounted on a tape recorder for upward and downward movement between a lowered operating position and a raised non-operating position. The cassette receiving means is provided with a cassette ejector to eject the tape cassette out of the receiving means thereby permitting it to be easily withdrawn or removed. As the tape cassette is manually inserted into the receiving means against the action of the ejector, the sliding movement of the cassette results in the automatic lowering of the receiving means to the lowered operating position where the tape cassette is in operative association with the tape recorder elements. The cassette receiving means is operatingly connected to the tape recorder body through at least two parallel-extended levers which are pivotally articulated at their opposite ends to the receiving means and the tape recorder body, respectively, so that the receiving means undergoes the vertical movement while constantly maintaining a parallel relation to the tape recorder base. No provision is made for turning the cassette over.

OBJECTS OF THE INVENTION

It is a general object of this invention to provide improved means for recording and playback of video and audio tapes contained in cassettes;

It is a more specific object of the invention to provide improved means for utilizing the one-directional, constant-speed mode of operation of certain video and audio tape recorders and reproducers.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several Figures of which like reference numerals identify like elements, and in which:

DESCRIPTION OF THE PREFERRED EMBODIMENT

Figure 1:
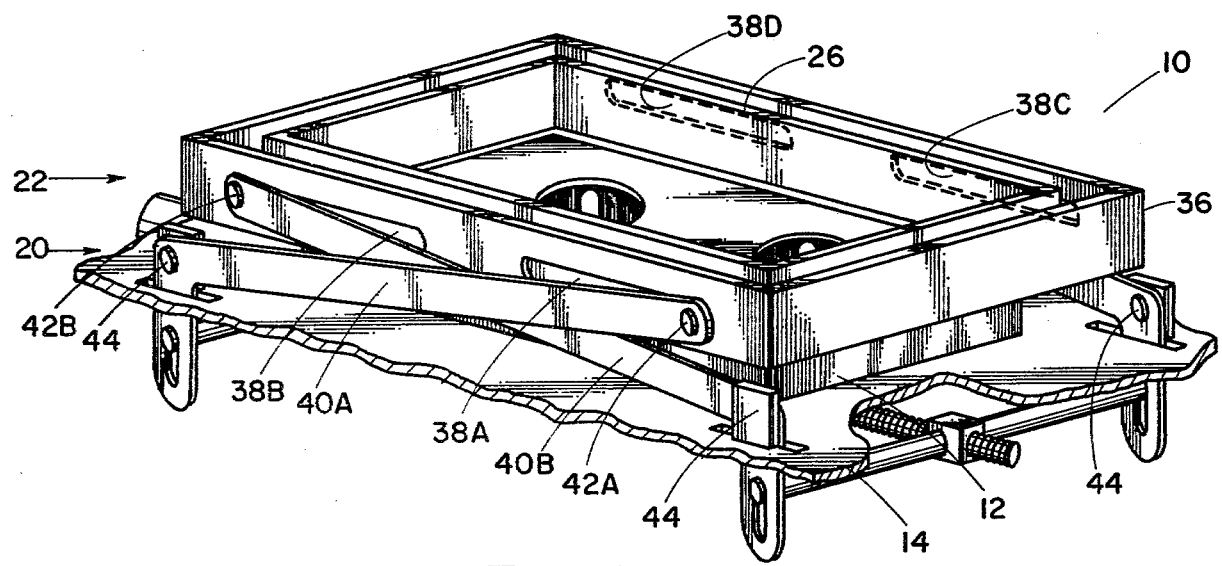
FIG. 1 is a view in perspective showing the operating section of the tape recorder/reproducer with a cassette turnover mechanism according to the invention; the illustration is simplified to facilitate understanding; further details are added in subsequent illustrations.
Figure 2:
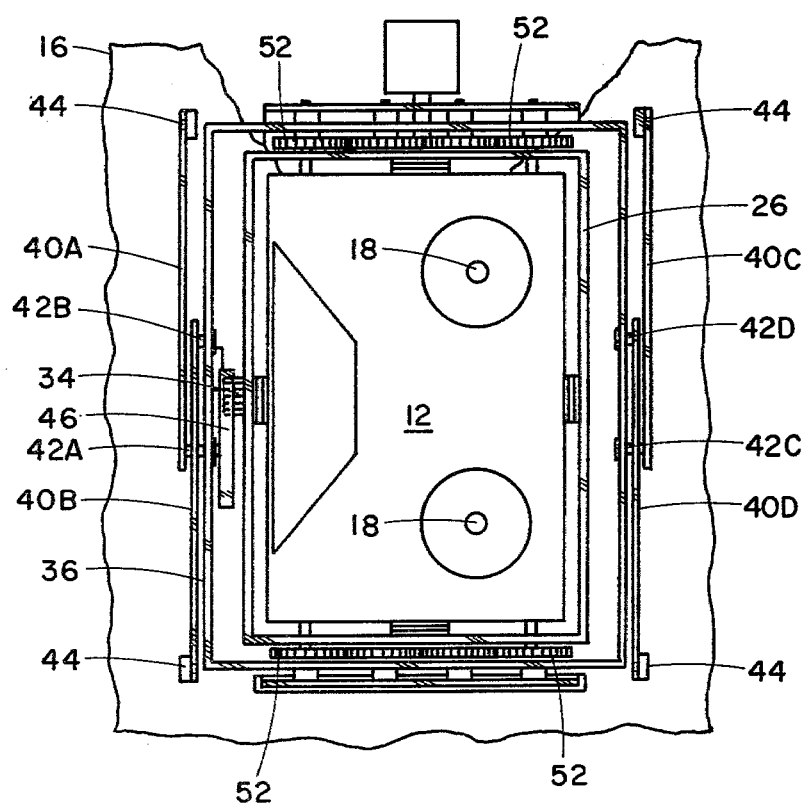
FIG. 2 is a top plan view of the cassette turn-over mechanism according to the invention in relation to a video cassette; parts in addition to those shown in FIG. 1 are illustrated.

Referring now to the drawings wherein like reference numerals designate like or corresponding parts throughout the several views, there is shown initially in FIGS. 1-4 a turn-over mechanism 10 for the rectangular type cassette 12 used in video and audio tape recorders/reproducers and the like. The cassette shown is of the type used for video tapes, and is depicted for exemplary purposes. The turn-over mechanism according to the invention permits the recording and playback of plural-track magnetic tapes contained in the cassette in either of two directions.

The tape recorder/reproducer 14 (shown as a fragment) has a cassette receiving deck 16 including conventional cassette orienting means, tape take-up spindles 18, and transducer means (not shown), all as is well-known in the art. The turnover mechanism according to a preferred embodiment of the invention provides for three levels of operation—a first level 20 indicated by the arrows in the FIGS. 3 and 4 wherein the cassette is positioned on deck for recording and playback; a second level 22 above deck 16 for loading and unloading of cassette 12; and a third level 24 highest above deck 16 for turning over cassette 12. The turn-over mechanism according to the invention comprises the components described in sequence from the general to the detailed in the followng, in combination.

A cassette holding means 26 comprises a frame enclosing cassette 12. Means for detachably retaining cassette 12 in holding means 26 may comprise a plurality of retractible leaf springs attached to cassette holding means 26 and pressing inwardly against cassette 12, as will be described.

Cassette holding means 26 includes exteriorly attached pivot means 32A and 32B lying in the plane of the minor axis of the cassette holding means 26, which is shown as being rectangular. A pinion gear 34 is located coaxial with pivot means 32A and is affixed to cassette holding means 26.

A main frame holding means 36 encloses cassette holding means 26, as shown, and is joined to cassette holding means 26 interiorly by engagement with pivot means 32A and 32B, as shown. Main frame means 36 is shown as having a plurality of longitudinally extending slots 38A-D.

Figure 3:
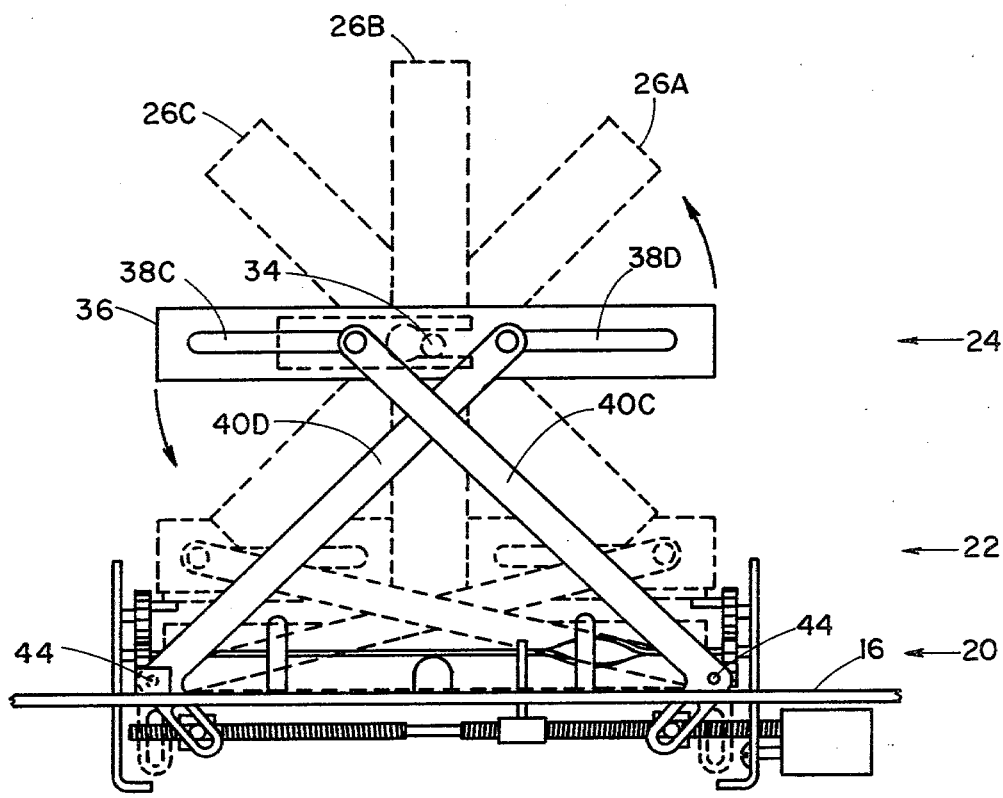
FIG. 3 is a side view in elevation of the turn-over mechanism according to the invention during the cassette turn-over.
Figure 4:
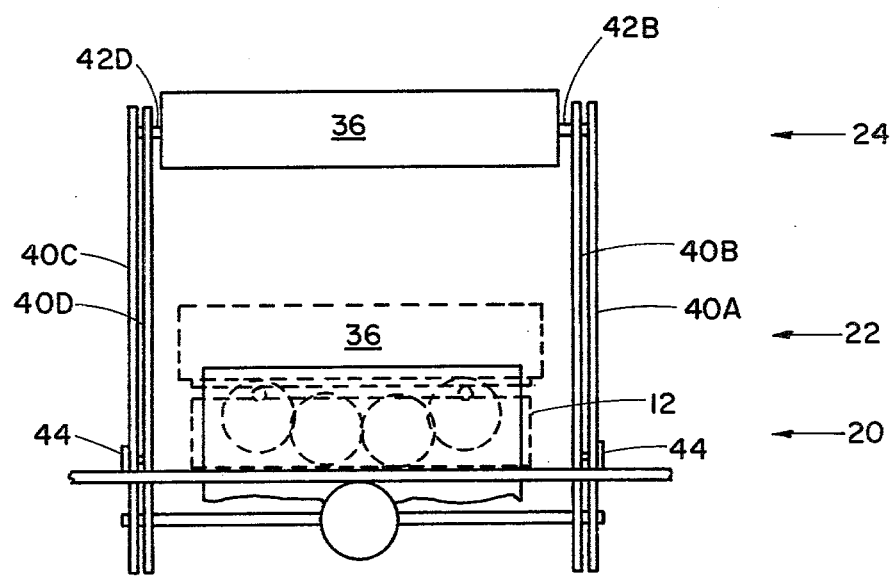
FIG. 4 is an end view of the FIG. 3 mechanism.

Two pairs of cross-connected arm means 40A-D, one pair on each side of main frame means 36, provide for raising and lowering the combined main frame means 36, the enclosed cassette holding means 26, and cassette 12 between second level 22 and third level 24. Each arm means has at one end slider means 42A-D for exteriorly slidably engaging respective associated slots 38A-D in main frame means 36. At the opposite end of arm means 40A-D are pivotal attachment means 44 for pivotal attachment to deck 16. Arm means 40A-D are oriented substantially parallel when main frame 44 and its enclosures is in first level 20 or second level 22. When main frame means 44 is elevated to the third level 24, arm means 40A-D are in crossed juxtaposition, as shown by FIG. 3.

FIG. 1 shows the relationship of the main frame holding means 36 and the enclosed cassette holding means 26 when the cassette is in record/reproduce position on deck 16. The cassette is shown as being in first position 20 and the cassette holding means 26 is at second level 22 and in position to receive cassette 12 when the turn-over of cassette 12 is desired. The details of how cassette 12 is elevated from first level 20 to second level 22, where it is retained by cassette holding means, will be described subsequent to the general overall description of turn-over operation that follows.

Here follows a summary description of the sequence of operation of the turn-over means according to the invention; further details enabling on skilled in the art to make and use the invention follow this description. Cassette 12 is raised from first level 20, the record/reproduce level on deck 16 to second level 22 (by means to be described) where it is received and retained by cassette holding means 26, which is in turn enclosed by main frame means 36. Cassette 12 is further elevated to third level 24, this time by arm means 40A-B which are substantially parallel at second level 22, but in elevating the main frame 36 and the enclosed cassette to the third level 24, moved into crossed juxtaposition. As the main frame means 36, including the cassette holding means 26 and the enclosed cassette 12, is elevated toward third level 24, a toggle plate means 46 causes cassette holding means 26 to rotate 90° within main frame means 36, and as the combination of main frame means 36 and enclosed cassette holding means 26 is lowered from third level 24 toward second level 22, toggle plate means 46 causes cassette holding means 26 to rotate at additional 90°, completing the turn-over cycle. Main frame means 36 and the enclosed cassette holding means 26 come to rest at second level 22. Cassette 12 is then lowered to the first level 20 to deck 16 for recording/reproduction by means as will be described.

The means for (a) urging arm means 40A-D upwardly or downwardly, (b) for raising and lowering cassette 12 between the first and second levels 20 and 22, and (c) for causing the 180 degree rotation of cassette 12 will now be described.

Figure 5:
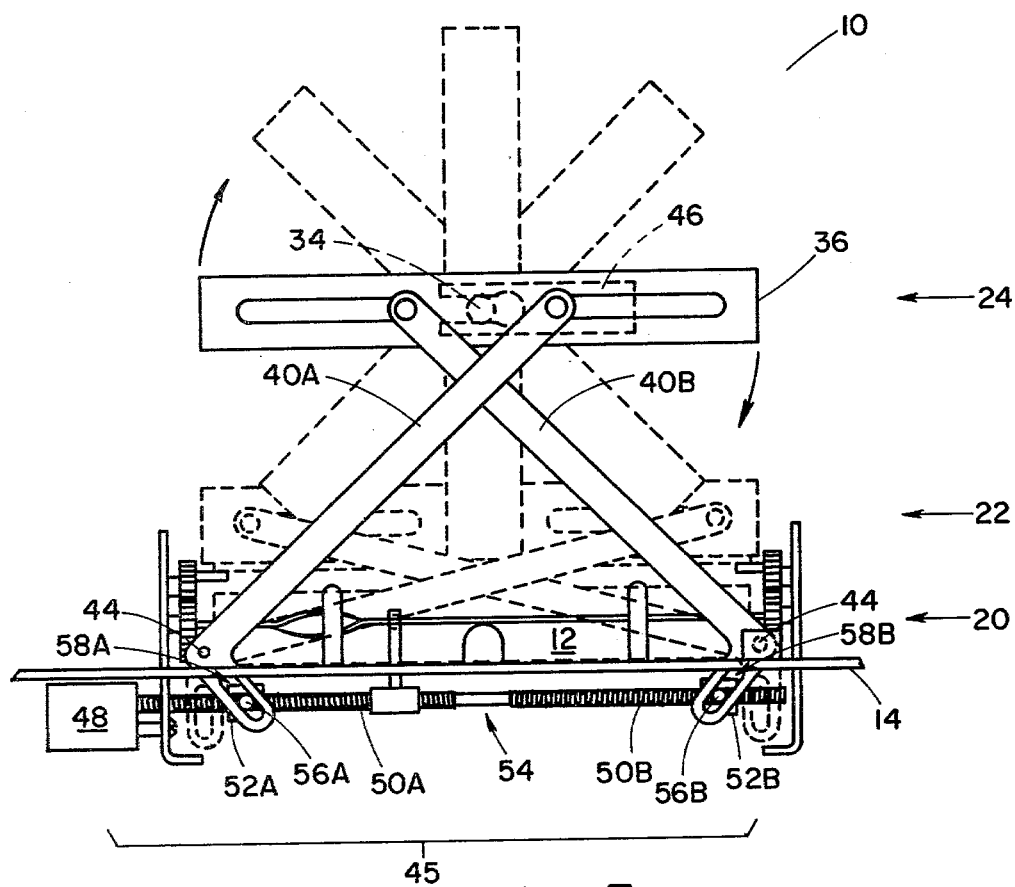
FIGS. 5 and 6 are views in elevation of a side and an end respectively showing additional details of the turn-over mechanism according to the invention.
Figure 6:
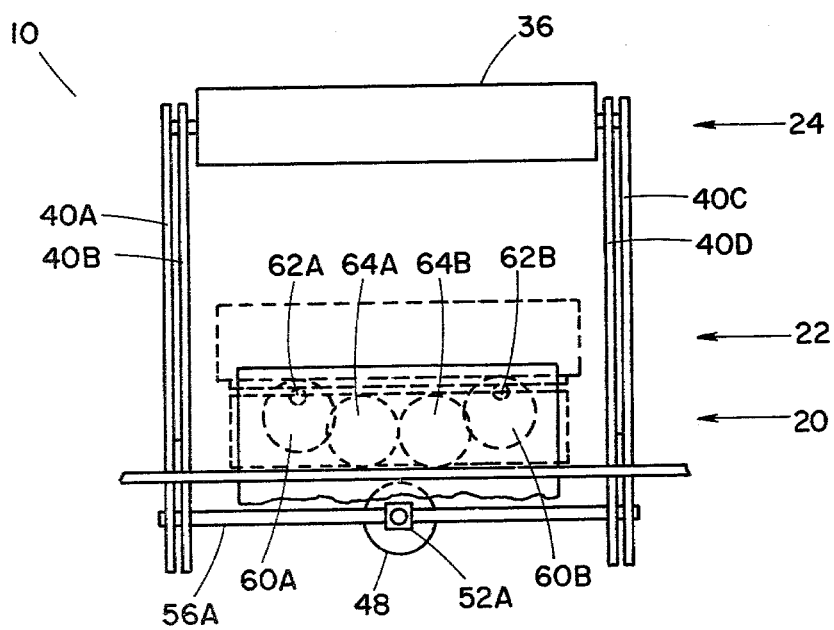

With additional reference now to FIGS. 5 and 6, there is shown the turn-over mechanism 10 according to the invention with the addition now of turn-over mechanism drive means 45, indicated by the bracket. Drive means 45 may comprise, for example, a reversible motor 48, indicated diagrammatically, which causes drive screw 50 to rotate in either of two directions. Drive screw 50 comprises two sections—section 50A may consist of right-hand threaded member, and section 50B may comprise a left-hand threaded member. When motor 48 is activated, thread followers 52A and 52B will move toward the center 54 of drive screw 50. Conversely, when motor 48 is reversed, thread follwers 52A and 52B will move away from center 54. As indicated by FIG. 6, drive screw follower 52A (representative also of drive screw follower 52B) has a slider rod 56A projecting therefrom. The distal ends of slider rod 56A slidably engage associated slots 58A and 58C in the ends of arm means 40A and 40C nearest the respective pivot points 44, as shown. Rotation of drive screw 58 in one predetermined direction causes drive screw followers 52A and 52B to move towards each other, resulting in the urging ofarm means 40A-D upwardly and the concurrent elevation of main frame means 36 to level 3. Conversely, the reversal of the rotation of drive screw 58 by reversing the direction of rotation motor 48 results in the lowering of arm means 40A-D and main frame means 36 to level 2.

It is to be noted that the means described for elevating and lowering main frame means 36; that is by use of the turn-over mechanism drive means 46 shown and attaching parts is not the only feasible means, and the foregoing description is not intended to be any way limiting. Other means such as, for example, cam means bearing upon the ends of arm means 40A-D nearest pivot point 44 could as well be used.

Figure 7:
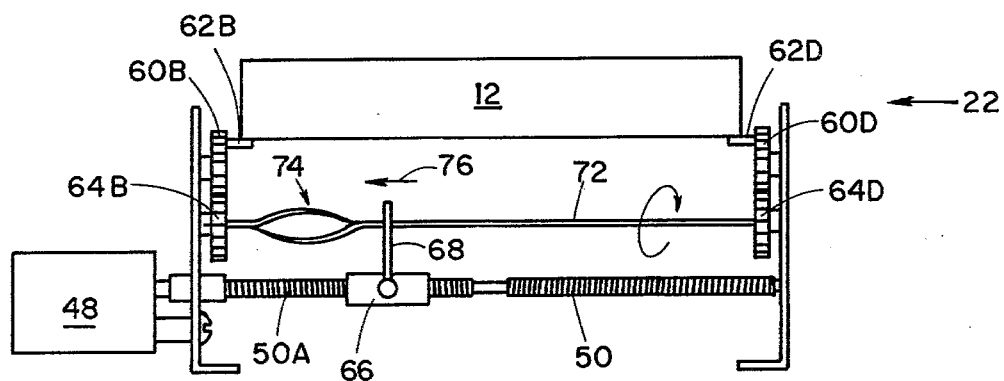
FIGS. 7 and 8 are views in elevation of the side and end respectively showing additional details of the invention.
Figure 8:
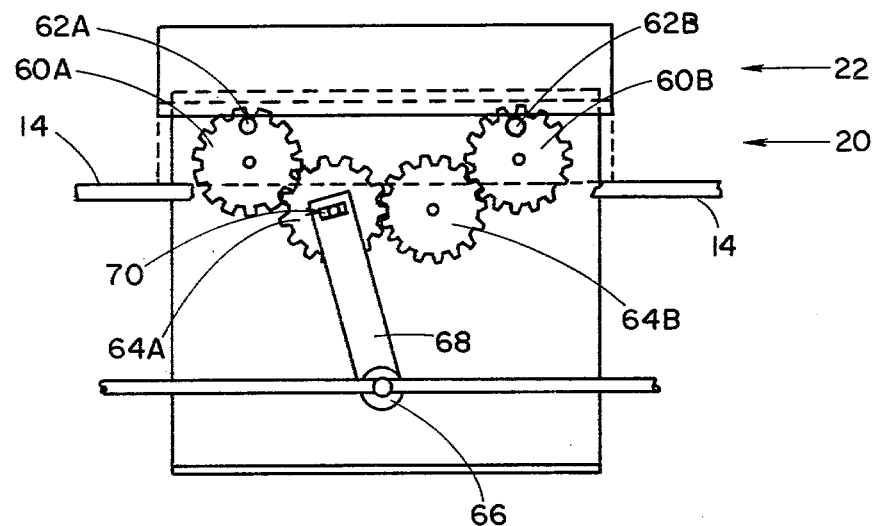

The means for raising and lowering cassette 12 between the first and second levels 20 and 24 utilizes elements of the turn-over mechanism drive means 45 heretofore described. With reference now additionally to FIGS. 7 and 8, cassette 12 is raised from first level 20, the deck 16 level wherein cassette 12 is held in the cassette holding means 26 which in turn is enclosed in main frame means 36, all as heretofore described. The raising and lowering of cassette 12 between the first and second levels 20 and 22 is the function of four mechanically linked disc cranks 60A-D having peripheral gear teeth. Crank pins 62A-D of disc cranks 60A-D operate in sliding contact with a base of cassette 12, as shown. Disc cranks 60A-D are synchronized in rotation by idler gears 64A-D, also having peripheral gear teeth which mesh with the peripheral gear teeth of disc cranks 60A-D. Thus disc cranks 60A-D are synchronized in rotation by the idler gears 64A-D. Disc cranks 60A-D are caused to rotate 180° to provide for excursion of cassette 12 between first and second levels 20 and 22 by the following means. Screw thread follower 66 has attached thereto a cam follower member 68. The distal end of member 68 has a slot 70 through which passes ribbon cam 72; e.g., a strip of metal rectangular in cross-section. Ribbon cam 72 is attached at the ends to idler gears 64A and 64D respectively; and rotation of the ribbon cam 72 causes idler gear 64A and 64D to rotate in unison. Section 74 of ribbon cam 72 comprises a 180° twist. Rotation of drive screw 50 causes movement of cam follower member 68 in the direction indicated by arrow 76. When the slot 70 of cam follower member 72 traverses the twisted section 74 of ribbon cam 72, ribbon cam 72 is caused to rotate 180°, causing rotation of idler gears 64A-D and rotation in turn of disc cranks 60A-D to raise or lower cassette 12.

Figure 9:
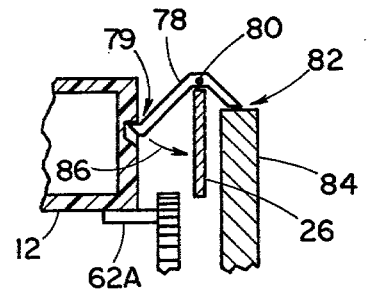
FIG. 9 is an schematic view in section showing details of the cassette retention means according to the invention.

After being raised to second level 22 by the disc cranks 60A-D as described, cassette 12 is caused to be retained in cassette holding means 26 by the spring retention means 78 shown by FIG. 9. A disc crank 60A, and attached pin 62A, (in conjunction with the other disc cranks as described,) is shown as having raised cassette 12 into cassette holding means 26, shown in section. Spring retention means 78 is hingedly attached at point 80 and is spring-biased inwardly to press upon the side of cassette 12 as indicated as cassette 12 is raised upwardly and into cassette holding means 26. Cassette 12 is frictionally held therein by contact point 79 as cassette 12 is raised to third level 24 and turned over.

When cassette holding means 26 of cassette 12 retained therein is lowered from third level 24 to second level 22 following the turnover process, end 82 of spring retention means 78 is contacted by post 84 which projects upwardly from deck 16 (attachment not shown). The upward pressure on end 82 of spring retention means 78 causes movement of contact point 79 in the direction indicated by arrow 86, releasing cassette 12 from cassette holding means 26. Two such spring retention means 78—one at each end of cassette holding means 26—are considered adequate for retention of cassette 12.

Figure 10:
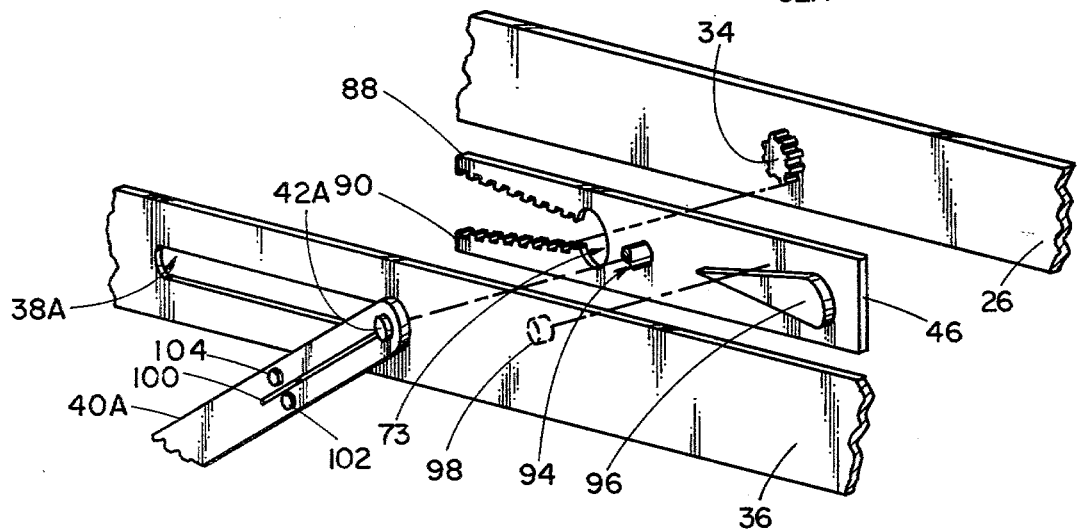
FIG. 10 is an exploded view in perspective showing details of the action of a toggle component according to the invention.

The action of toggle plate means 46 in causing cassette holding means 26 and cassette 12 retained therein to rotate 180° is shown by FIGS. 5 and 10, and 11A and 11B. The general relationship of the major parts involved in cassette turnover process is indicated by FIG. 10 wherein a side section of cassette holding means 26 is shown as being exploded from an adjacent section of main frame means 36 for illustrative purposes. Jaw-shaped toggle plate means 46 is coplanar with pinion gear 34 and has gear teeth in the upper jaw 88 opposed to gear teeth in the lower jaw 90, as shown. Toggle plate means 46 is attached and supported contiguous to its center point by an axial projection 94 of slider means 42A. Means for pivoting toggle plate means 46 on axial projection 94 such that the opposed gear teeth of upper jaw 88 and lower jaw 90 make contact with the teeth of pinion gear 34 are as described in the following paragraphs.

Toggle plate means has cam means 96 attached as shown. Cam follower 98 is held in contact with cam means 96 as indicated; the purpose is to hold the gear teeth in upper jaw 88, or lower jaw 90, in firm contact with pinion gear 34. The teeth of the upper and lower jaws 88 and 90 are caused to move in alternating contact with pinion gear 34 by the action of leaf spring 100, which causes toggle plate means 46 to pivot either upwardly or downwardly for alternating engagement of the gear teeth. FIG. 10 shows leaf spring 100 in a "neutral" position midway between spring stops 102 and 104; this neutral position occurs at some arbitrary point in the excursion of the main frame 36 between the second level 22 and third level 24. As arm means 40A is raised upwardly, slider means 42A moves toward pinion gear 34, causing toggle plate means 36 to move in the direction indicated by arrow 102. Engagement of the teeth of lower jaw 90 and pinion gear 34 plus the movement in the inward direction of toggle plate means 46, results in the 90° rotation of cassette holding means 26 through the path indicated by the dash-line configuration 26A of FIG. 3 to the upright position indicated by dash-line configuration 26B. The direction of movement in FIG. 3 is indicated by the circumferential arrows.

The teeth of lower jaw 90 are held in firm contact with the teeth of pinion gear 34 by the pressure of cam follower 98 riding on cam 96, as shown.

As toggle plate means 46 continues in the direction of the arrow 86, a point is reached where cam follower 98 completes its excursion of cam 96; this point is indicated by position 98A. At the same time, the teeth of pinion gear 34 enter disengaging area 104. The pressure of spring 100 causes toggle plate means 46 to shift and engage the teeth of upper jaw 88 with the teeth of pinion gear 34. Concurrently, the downward movement of the arm means 40A-D to lower main frame 36 is initiated, and toggle plate means 46 moves in an outwardly direction, as indicated, by arrow 106. The excursion of cam follower 98 along the lower side of cam 96 is indicated by cam position 98B; by this means, the gear teeth of upper jaw 88 are held in firm contact with the teeth of pinion gear 34. As a result, the turn-over cassette 12 is completed as indicated by FIG. 3.

Figure 11A:
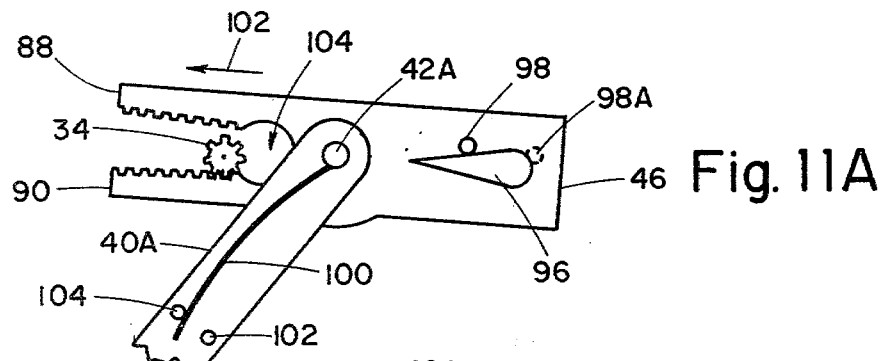
FIGS. 11A and 11B are views in elevation showing two positions of the component of FIG. 10 showing details of the cassette turn-over process.
Figure 11B:
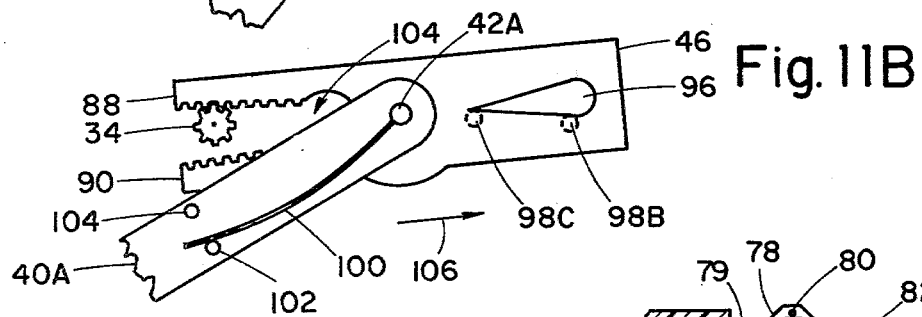

When main frame means 36 reaches the second level 22, the pressure of spring 100, indicated by FIG. 11B causes the toggle plate means to re-assume the position shown by FIG. 11A wherein the teeth of upper jaw 88 can again make contact with pinion gear 34. Toggle plate means 46 is allowed to move due to the fact that the cam follower 98 has reached position 98C, when the cam follower will again ride on the top side of cam 96. The cycle as described is repeated whenever turnover of a cassette is again desired.

Other changes may be made in the above-described apparatus without departing from the true spirit and scope of the invention herein involved. It is intended that the subject matter in the above depiction shall be interpreted as illustrative and not in a limiting sense.

I claim:

1. A turn-over mechanism for rectangular cassettes used in video and audio tape for recording/reproducing in a first and a second direction, said mechanism providing for turning over said cassette as it is raised and lowered from the operating deck of said recorder/reproducer, the improved mechanism comprising:
    cassette holding means for detachably retaining said cassette;
    main frame means enclosing said cassette holding means including pivot means for the rotation in the minor axis of said cassette within said main frame means;
    paired arm means for raising and lowering said main frame means from and to said operating station including means for urging said arm means upwardly or downwardly, each arm means being hingedly attached to said deck, and slidably engaging at the opposite end with said main frame means, said arm means holding said main frame means and said cassette substantially parallel with said deck during said raising and lowering;
    means for rotating said cassette holding means and said cassette 180° during said raising and lowering;
    means for lowering said cassette to said operating deck for playing said tape in said record direction.

2. A turn-over mechanism for the rectangular-type cassette used in video and audio tape recorders/reproducers and the like to permit the recording and playback of plural-track magnetic tapes contained in said cassette in either of two directions, said tape recorder/reproducer having a cassette receiving deck including a cassette orienting means, tape take-up spindles, and transducer means, said turn-over mechanism providing three levels of operation—a first level wherein said cassette is positioned on said deck for recording and playback; a second level above said deck for loading and unloading said cassette, and a third level highest above said deck for turning over said cassette, said mechanism comprising, in combination:
    cassette holding means comprising a frame enclosing said cassette including means for detachably retaining said cassette in said holding means, and further including exteriorly attached pivot means lying in the minor axis of said holding means, and having at least one pinion gear coaxial with said pivot means and affixed to said cassette holding means;
    main frame means enclosing said cassette holding means and joined thereto interiorly by engagement with said pivot means for rotating said cassette holding means within said main frame means, said main frame means having a plurality of longitudinally extending slots;
    two pairs of cross-connected armed means, one pair on each side of said main frame for elevating and lowering said main frame, said cassette holding means and said cassette between said second level and said third level, said arm means each having at one end slider means for exteriorly slidably engaging one of said slots of said main frame, and at the opposite end of each of said arm means, means for pivotal attachment to said main deck, said arm means being oriented, when said main frame is in said second level, substantially parallel, and when said main frame is elevated to said third level, in crossed juxtaposition;
    jaw-shaped toggle plate means coplanar with said pinion gear, said toggle plate means having opposed gear teeth in the upper and lower jaws thereof, said toggle plate means being pivotally attached and supported contiguous to its center point with one of said slider means of one of said arm means including means for pivoting said toggle plate means on said slider means such that the opposed gear teeth make serial engagement with said pinion gear during a cassette turn-over sequence;
    two pairs of mechanically linked disc crank means attached to said deck including means for reversibly rotating said crank means for raising and lowering said cassette between said first level and said second level for the loading and unloading a said cassette in said cassette holding means, said raising and lowering being accomplished by contact of the cranks of said disc crank means operating in sliding contact with the base of said cassette during rotation of said disc crank means;
    means for urging said arm means upwardly from said substantially parallel orientation to said crossed juxtaposition orientation by rotation about said pivotal attachment of said arm means to said deck, causing the elevation of said main frame from said second level to said third level, said slider means sliding in said slots in said main frame;
    during elevation of said main frame, the teeth of one of said jaws of said toggle plate mens being moved to engagement with said pinion gear, and during the lowering of said main frame, the teeth of the opposite one of said jaws being moved to engagement with said pinion gear, the reciprocating action and serial engagement of said gear teeth with said pinion gear yielding approximately 180 degree rotation of said cassette holding means within said main frame, following which action, said arm means lower said main frame to said second level, and said disc crank means rotates to lower said cassette to said first level for recording or playback of said tape.

* * * * *